United States Patent
Whiffen et al.

(10) Patent No.: US 11,412,777 B2
(45) Date of Patent: Aug. 16, 2022

(54) ROD INSPECTION METHOD AND APPARATUS

(71) Applicant: British American Tobacco (Investments) Limited, London (GB)

(72) Inventors: Sam Whiffen, London (GB); Gary Fallon, London (GB); Chris Daly, London (GB); Nicholas Fox, Loughborough (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 159 days.

(21) Appl. No.: 16/649,243

(22) PCT Filed: Oct. 9, 2018

(86) PCT No.: PCT/GB2018/052878
§ 371 (c)(1),
(2) Date: Mar. 20, 2020

(87) PCT Pub. No.: WO2019/073214
PCT Pub. Date: Apr. 18, 2019

(65) Prior Publication Data
US 2020/0375241 A1    Dec. 3, 2020

(30) Foreign Application Priority Data

Oct. 10, 2017 (GB) ..................................... 1716550

(51) Int. Cl.
*A24C 5/34*      (2006.01)
*A24C 5/18*      (2006.01)
*G01N 23/083*   (2018.01)

(52) U.S. Cl.
CPC .......... *A24C 5/3412* (2013.01); *A24C 5/1871* (2013.01); *G01N 23/083* (2013.01); *G01N 2223/621* (2013.01)

(58) Field of Classification Search
CPC .. A24C 5/1871; A24C 5/3412; G01N 23/083; G01N 2223/621
See application file for complete search history.

(56) References Cited

U.S. PATENT DOCUMENTS 2,861,683 A    11/1958  Gilman
2,932,391 A     4/1960  Broekhuysen
(Continued)

FOREIGN PATENT DOCUMENTS

GB    759532    10/1956
GB    777623     6/1957
(Continued)

OTHER PUBLICATIONS

International Search Report for corresponding application PCT/GB2018/052878 filed Oct. 9, 2018; dated Jan. 2, 2019.
(Continued)

*Primary Examiner* — Eric Yaary
(74) *Attorney, Agent, or Firm* — Cantor Colburn LLP

(57) ABSTRACT

A method of determining the density of an elongate rod of material as it travels in a longitudinal direction through an inspection zone of apparatus for determining the density of an elongate rod of material is disclosed. The method comprises: positioning an X-ray generator of said apparatus to transmit X-rays in a direction across the elongate rod and towards a detector of said apparatus, as the elongate rod travels in a longitudinal direction through said inspection zone of said apparatus; supplying a voltage to the X-ray generator of between 20 to 80 kV to transmit the X-rays at a predetermined intensity; detecting the intensity of the
(Continued)

X-rays transmitted through the elongate rod using the detector, and determining a density of the elongate rod based on a comparison of the predetermined and detected intensities. A method of manufacturing tobacco industry products that includes the above inspection method is also disclosed, together with apparatus for determining the density of an elongate rod of material.

4 Claims, 2 Drawing Sheets

(56) References Cited

U.S. PATENT DOCUMENTS

| | | | |
|---|---|---|---|
| 3,056,026 | A | 9/1962 | Bigelow |
| 3,146,780 | A | 9/1964 | Harrison |
| 3,655,976 | A | 4/1972 | Doering |
| 4,574,816 | A | 3/1986 | Rudszinat |
| 4,616,662 | A | 10/1986 | Hartmann |
| 4,785,830 | A | 11/1988 | Moller |
| 4,805,641 | A | 2/1989 | Radzio |
| 4,848,369 | A | 7/1989 | Siems |
| 4,865,052 | A | 9/1989 | Hartmann |
| 4,865,054 | A | 9/1989 | Lorenzen |
| 4,875,494 | A | 10/1989 | Siems |
| 5,060,664 | A | 10/1991 | Siems |
| 5,099,504 | A | 3/1992 | Pettit |
| 5,510,616 | A | 4/1996 | Seymour |
| 5,651,041 | A | 7/1997 | Moller |
| 5,762,075 | A | 6/1998 | Hoppe |
| 5,797,406 | A | 8/1998 | Dawson |
| 6,385,284 | B1 | 5/2002 | Parmee |
| 2002/0141535 | A1 | 10/2002 | Torai |
| 2005/0129178 | A1 | 6/2005 | Pettit |
| 2014/0064445 | A1* | 3/2014 | Adler ................ G21K 7/00 378/43 |
| 2016/0213344 | A1* | 7/2016 | Yi ................ A61B 6/5282 |

FOREIGN PATENT DOCUMENTS

| | | |
|---|---|---|
| GB | 781041 | 8/1957 |
| GB | 781042 | 8/1957 |
| GB | 781047 | 8/1957 |
| GB | 781049 | 8/1957 |
| GB | 781050 | 8/1957 |
| KR | 900005220 B1 | 7/1990 |
| KR | 100942285 B1 | 2/2010 |
| KR | 20120124087 A | 11/2012 |
| KR | 20110013587 | 3/2017 |
| WO | 9729654 A1 | 8/1997 |

OTHER PUBLICATIONS

Written Opinion for corresponding application PCT/GB2018/052878 filed Oct. 9, 2018; dated Jan. 2, 2019.
International Preliminary Report on Patentabilty for corresponding application PCT/GB2018/52878 filed Oct. 9, 2018; dated Jan. 1, 2020.

* cited by examiner

ROD INSPECTION METHOD AND APPARATUS

TECHNICAL FIELD

The present invention relates to a method of using X-rays to determine the density of an elongate rod of material as it travels in a longitudinal direction through an inspection zone. It also relates to a method and apparatus for simultaneously determining the density of each of two elongate rods of material travelling side-by-side in a longitudinal direction through an inspection zone. The invention further relates to a tobacco industry product manufacturing machine incorporating the inspection apparatus of the invention. In each case, the invention particularly relates to a determination of the density of a rod of tobacco wrapped in paper, which is formed as part of the process for manufacturing a tobacco industry product, such as a smoking article.

BACKGROUND

In the high-speed manufacture of tobacco industry products such as smoking articles, cut tobacco is continuously formed into an elongate tobacco rod which is wrapped in paper before the wrapped rod is cut into lengths to form individual smoking articles. A filter may be attached to each individual wrapped elongate tobacco rod as part of the manufacturing process.

Smoking articles typically need to be manufactured so that each rod contains a predetermined amount of tobacco. To ensure that smoking articles are consistently being manufactured to the specified design and quality, it is known to measure the density of the tobacco rod by continuously inspecting it as it passes in a longitudinal direction through the machine, before it is cut. Traditionally, this has been achieved by providing a nucleonic source that emits beta rays towards the moving tobacco rod as it travels through an inspection zone along a path between the source, and a detector positioned so as to determine the amount of radiation that is transmitted through the rod.

As sources of radiation require careful handling and control, it has recently become more common to determine tobacco rod density using microwave energy. However, the use of microwave energy has its limitations, as it cannot be used when the tobacco rod incorporates a laminated metal foil wrap or other optically opaque material. For non-smokable consumables in which the tobacco rod is heated without combustion, it has become common for the tobacco rod to be wrapped in a laminate of paper and another material, such as aluminium foil, which is impervious to microwaves.

SUMMARY

According to an aspect of the invention, there is provided a method of determining the density of an elongate rod of material as it travels in a longitudinal direction through an inspection zone of apparatus for determining the density of an elongate rod of material, wherein the method comprises:
  (a) positioning an X-ray generator of said apparatus to transmit X-rays in a direction across the elongate rod and towards a detector of said apparatus, as the elongate rod travels in a longitudinal direction, through said inspection zone of said apparatus;
  (b) supplying a voltage to the X-ray generator of between 20 to 80 kV to transmit the X-rays at a predetermined intensity;
  (c) detecting the intensity of the X-rays transmitted through the rod using the detector, and
  (d) determining a density of the elongate rod based on a comparison of the detected and predetermined intensities.

As X-rays are absorbed by a material in proportion to its density, the amount of x-rays that have not been impeded by the material is directly related to the density of that material. Therefore, an X-ray intensity which is indicative the density of the elongate rod can be obtained by comparing the intensity of the transmitted X-rays before they have passed through the elongate rod with the intensity of the X-rays after they have passed through the elongate rod.

The method may particularly comprise operating the X-ray generator at a voltage in the range of 20-60 kV.

The method may comprise supplying the X-ray generator with a current of between 0.3-1 mA. In particular, the current is preferably 0.6 mA.

The method may utilise a detector comprising of a back illuminated photodiode array and a caesium iodide scintillator. The detector may further comprise an optically opaque resin to maximise sensitivity.

Preferably, the elongate rod is a rod of tobacco comprising homogeneous, reconstituted cut tobacco wrapped in a laminate of paper and metal foil. The metal foil is preferably aluminium and it may have a thickness of between 6 to 12 microns. More preferably the aluminium layer will have a thickness of 6 to 9 microns.

The method of the invention may be used to determine the density of an elongate rod of tobacco comprising homogenous, reconstituted, cut tobacco wrapped in a laminate of wrapping material and metal foil.

According to another aspect of the invention, there is provided a method of manufacturing tobacco industry products using a tobacco industry product manufacturing machine, the method comprising:
  (a) forming a wrapped elongate rod of tobacco;
  (b) passing said wrapped elongate rod of tobacco through an inspection zone of the apparatus for determining the density of an elongate rod according to the invention; and
  (c) cutting said wrapped elongate rod to form individual tobacco rod elements.

The method may further comprise attaching a filter portion to each of said individual tobacco rod elements to form tobacco industry products.

According to another aspect of the invention, there is provided apparatus for determining the density of an elongate rod of material as it travels in a longitudinal direction through an inspection zone of said apparatus, comprising:
  (a) an X-ray generator to transmit X-rays in a direction across the elongate rod as it travels in a longitudinal direction through said inspection zone;
  (b) a voltage source to supply a voltage to the X-ray generator of between 20 to 80 kV to transmit the X-rays at a predetermined intensity;
  (c) a detector to detect the intensity of X-rays transmitted through the elongate rod, and
  (d) a signal processor to determine a density of the elongate rod based on a comparison of the predetermined and detected intensities.

According to another aspect of the invention, there is provided apparatus for simultaneously determining the density of each of two rods of material travelling side-by-side in a longitudinal direction, the apparatus comprising an X-ray generator positioned to transmit X-rays of a predetermined intensity in a direction across both elongate rods, a respective detector associated with each elongate rod and a signal processor, each of said respective detectors being configured to independently detect the intensity of X-rays transmitted through an associated elongate rod and to send a signal indicative of said detection to said signal processor, the signal processor being configured to compare said detected intensity as determined by a respective detector with the predetermined intensity to determine the density of each rod.

Preferably, the apparatus comprises a reference detector for detecting the intensity of X-rays generated by the X-ray generator, the reference detector being positioned to detect X-rays that have not been transmitted through the elongate rods of material travelling side-by-side in a longitudinal direction.

According to an aspect of the invention, there is provided a method of determining the density of an each of two elongate rods of material as they travel in side-by-side in a longitudinal direction, wherein the method includes:
  (a) positioning the X-ray generator to transmit X-rays at a predetermined intensity and in a direction across both elongate rods towards a respective detector associated with each elongate rod;
  (b) detecting the intensity of X-rays transmitted through each elongate rod using the respective detector associated with each rod, and
  (c) determining a density of each elongate rod based on a comparison of the intensity detected by a respective detector and the predetermined intensity.

The method may comprising operating the X-ray generator at a voltage of between 20-80 kV. Most preferably, at a voltage of 20-60 kV.

The method may comprise supplying the X-ray generator with a current of between 0.3-1 mA, preferably 0.6 mA.

The method may be used to determine the density of an elongate rod of tobacco comprising homogenous, reconstituted cut tobacco wrapped in a laminate of wrapping material and metal foil.

In a preferred embodiment, the method of the invention is used to determine the density of an elongate rod of tobacco comprising homogenous, reconstituted cut tobacco wrapped in a laminate of paper and metal foil. The metal foil may be formed from aluminium and have a thickness of between 6 to 9 microns. The tobacco rod may have a diameter of between 5.3 mm to 7.9 mm.

According to the invention, there is also provided a tobacco industry product manufacturing machine comprising the apparatus, according to the invention, for simultaneously determining the density of each of two elongate rods of material travelling side-by-side in a longitudinal direction along respective inspection paths.

According to another aspect of the invention, there is provided a method of manufacturing tobacco industry products using a tobacco industry product manufacturing machine, the method comprising:
  (a) forming two wrapped elongate rods of tobacco;
  (b) passing said wrapped elongate rods of tobacco in a longitudinal direction side-by-side through an inspection zone of apparatus for determining the density of each of said rods according to claims 9 or 10; and
  (c) cutting each of said rods to form individual tobacco rod elements.

Preferably, the method includes attaching a filter portion to each of said individual tobacco rod elements to form tobacco industry products.

In some embodiments, the density of the tobacco rod is sampled at least every 2 mm intervals as the rod(s) pass through the inspection zone. This approximates to a sample rate of 5 kHz.

BRIEF DESCRIPTION OF THE DRAWINGS

Embodiments of the invention will now be described, by way example only, with reference to the accompanying drawings, in which.

DETAILED DESCRIPTION

Figure 1:
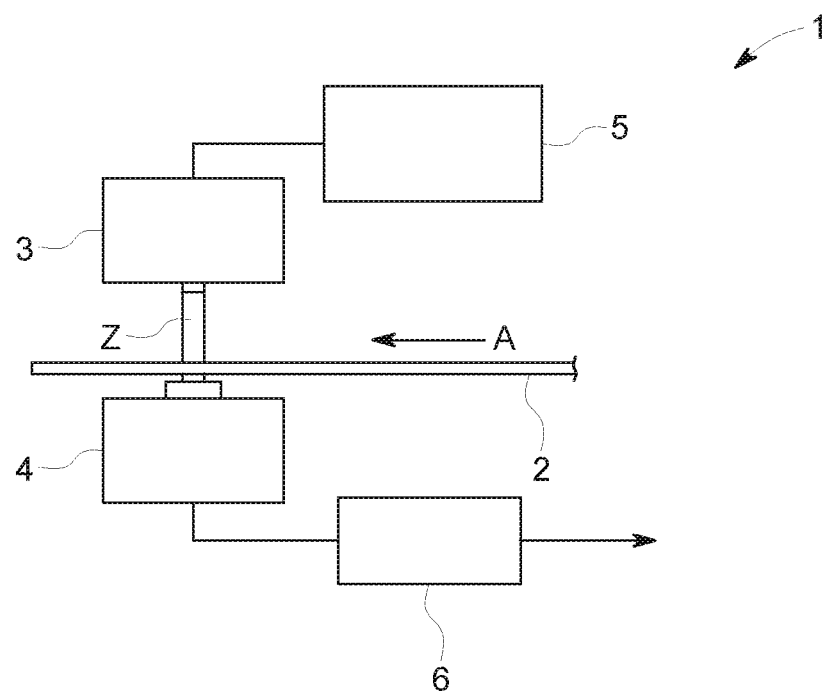
FIG. 1 is a general representation of the apparatus according to an embodiment of the invention.
Figure 4:
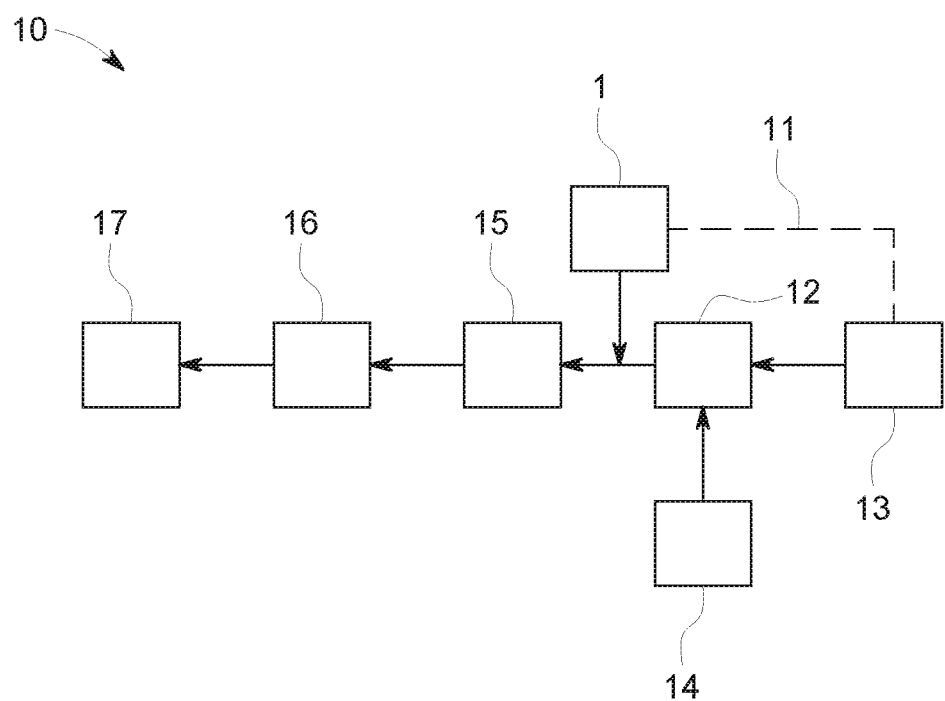
FIG. 4 shows how the inspection apparatus might be incorporated into a tobacco industry product manufacturing machine.

With reference to the drawings, there is shown in FIG. 1 a general representation of an apparatus 1 for inspecting elongate rods 2, in this case tobacco industry products such as rods of cut tobacco wrapped in paper which are formed as part of the process for the manufacture of smoking articles such as cigarettes in a tobacco industry product manufacturing machine 10 (see FIG. 4). The apparatus 1 is used to determine the density of the rod 2, in particular, the density of the cut and reconstituted tobacco contained in the rod 2, to ensure that it remains consistent and within predetermined limits. It is envisaged that, if the density drops or exceeds a predetermined density, then an alarm may be signalled to an operator. More preferably, the tobacco industry product manufacturing machine 10 may incorporate a feedback loop 11 so the amount of tobacco being fed into the machine for manufacturing the rods is automatically changed to bring the density back to a desired value or within a desired range of values in dependence on the signals received from the inspection apparatus 1.

As can be seen in FIG. 1, the paper wrapped rod 2 of tobacco is travelling in a longitudinal direction indicated by arrow 'A'. The path of the tobacco rod 2 is such that it travels through an inspection region or zone 'Z' between an X-ray generator 3 and an X-ray detector 4. The X-ray generator 3 is positioned so that, when supplied with an appropriate voltage from a high-voltage generator 5 connected to the X-ray generator 4, it will transmit X-rays in a direction across the path of the tobacco rod 2 through the inspection zone 'Z' and towards the detector 4. Preferably, the X-rays are transmitted in a direction which is perpendicular to the path of the elongate rod.

A known voltage is supplied to the X-ray generator 3 so that it generates X-rays at a known predetermined intensity. Furthermore, the detector 4 is positioned to detect the intensity of the X-rays that have been transmitted through the tobacco rod 2, and to generate a signal indicative of that density which is supplied to a signal processor 6, which includes an analogue logic circuit board, which may feed a single analogue output signal 11 to the tobacco industry product manufacturing machine 10 to control the feed of tobacco during rod formation.

The X-rays are attenuated through the tobacco rod 2 and wrapping material and some will scatter out of range of the detector 4. The absorption or attenuation of X-rays by the tobacco rod 2 is proportional to its density. Therefore, by using the signal processor 6 to compare the known predetermined intensity of the X-rays generated by the X-ray generator 3 prior to transmission through the rod 2, with the intensity of the X-rays transmitted through the rod 2 and detected by the detector 4, the density of the tobacco rod 2 can be determined.

The apparatus incorporates a controller running a real-time software program that will sample the analogue signal to achieve a sample rate of up to ops. The program will then calculate the density of the tobacco rod 2 using a conversion factor on the X-ray signal.

There are a number of factors which will affect detection accuracy. In the short term (micro to milliseconds) the electronic generation of X-rays will vary due to the inherent quantum nature of the conversion of an electron beam into x-rays as it strikes the target within the X-ray generator 3. In the medium term (milliseconds), the generation of X-rays may vary due to the stability of the high voltage generator 5. Furthermore, over the longer term (days/weeks/months), aging effects within the tube of the X-ray generator 3 may see a "softening" of the tube characteristics which may change the spectrum and characteristics of the tube output over time.

With reference to the detector 4, which may be a silicon photodiode, the dark level noise current will vary directly related to changes in temperature of the device, which will manifest itself as a variable offset to the signal. Over a longer term, effects from radiation damage to the silicon substrate may cause softening of the diodes response. Finally, due to an initial x-ray aging effect, the quantum efficiency, i.e. the ability to convert x-rays to visible light, may gradually decline over weeks/months.

To minimise the effect of these variables, the apparatus, according to some embodiments, may optionally provide for the generation of a reference signal to monitor the output of the X-ray generator 3. A reference detector 7 is positioned to detect the intensity of X-rays transmitted from the X-ray generator 3 but unimpeded by the tobacco rod 2. The output of the reference detector 7 is then used to calibrate and modify the signal channel to compensate for the variables listed above. By providing a reference detector 7, and by subtracting the signal from the reference detector 7 from the detector 4 that detects the X-rays transmitted through the rod 2, the random noise of the signal is reduced and so the signal to noise ratio is improved. The reference detector 7 effectively measures any scattering of X-rays caused by air or dust in the inspection zone 'Z'. It also compensates for any random thermal effects.

The apparatus may additionally include a temperature controller (not shown) for the detector 4 and/or the reference detector 7, to stabilise any shift in dark level noise for the purpose of maintaining a constant temperature.

In addition to the X-ray generator 3, the detector 4 and the reference detector 7, the apparatus may further include a focusing lens and/or beam collimator (not shown) to manipulate and focus the X-rays towards the tobacco rod 2.

It is envisaged that the inspection apparatus 1 will be incorporated into a tobacco industry product manufacturing machine 10, and so the tobacco rod 2 will be inspected immediately, or only very shortly, after it has been formed by the machine. A tobacco industry product manufacturing machine is illustrated in FIG. 4. The machine may be of a 'single-track' type, in which a single elongate wrapped tobacco rod is formed by the machine and passes through the inspection zone 'Z' of the inspection apparatus 1. However, the machine may be of the 'dual-track' type, in which two elongate tobacco rods 2a, 2b are formed and pass through the inspection zone 'Z' in side-by-side, preferably parallel, spaced relation. One such dual-track machine is known as the Hauni M5. In this latter case, the inspection apparatus is modified according to the embodiment of FIG. 3, described in more detail below, to enable the density of both rods to be determined simultaneously using a single X-ray generator 3. It will also be appreciated that the apparatus may also be independent of, or remote from, the tobacco industry product manufacturing machine 10.

Figure 3:
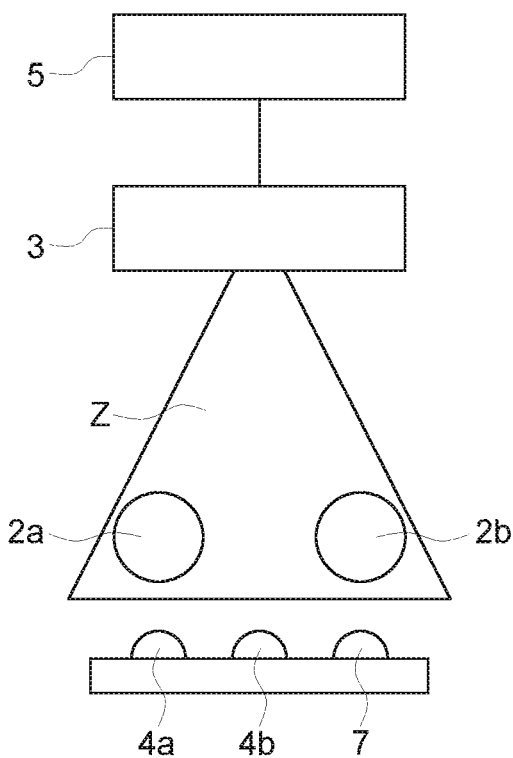
FIG. 3 shows a similar illustration to FIG. 2, but for another embodiment in which two tobacco rods are inspected simultaneously.

With reference to the embodiment of FIG. 3, there is shown an inspection apparatus 1 according to an embodiment for simultaneously detecting the density of two elongate tobacco rods 2a, 2b travelling side-by-side in a longitudinal direction through an inspection zone 'Z'. Even though there are two rods 2, this embodiment still relies on only a single X-ray generator 3, but has an additional detector 4b to detect the intensity of the X-rays transmitted through the second tobacco rod 4b independently to the intensity of the X-rays transmitted through the other tobacco rod 4a.

Figure 2:
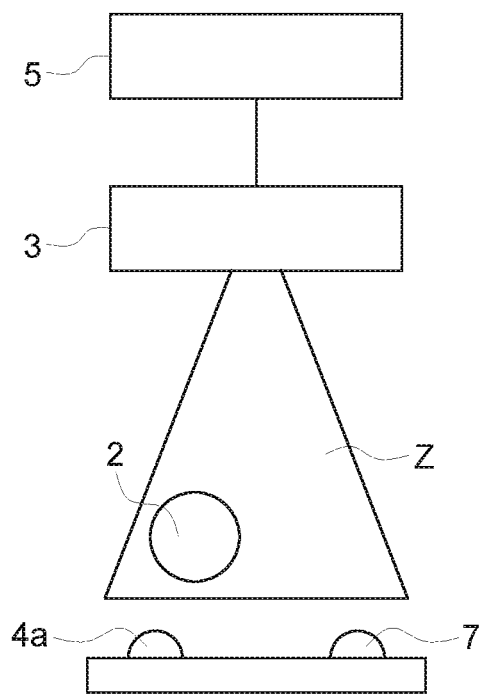
FIG. 2 shows the relative positions of the X-ray generator, detector and a reference detector in more detail, in an embodiment in which a single tobacco rod is being inspected.

In a similar way to the embodiment of FIG. 2, each detector 4a, 4b supplies a signal indicative of the detected intensity to the signal processor 6 for comparison with the intensity of the X-rays emitted by the generator 3 so that the density of the tobacco of each rod 2a, 2b can be detected separately and independently of the other tobacco rod 2a, 2b.

As with the embodiment of FIG. 2, the embodiment of FIG. 3 may also include a reference detector 7 to detect the intensity of X-rays transmitted through the inspection zone 'Z' without passing through either of the tobacco rods 2, to compensate for any dust, debris or thermal effects that may be present or occur in the inspection zone 'Z'. In an inspection apparatus for determining the density of two tobacco rods 2a, 2b simultaneously, it may become more important to control the direction of the transmitted X-rays, using a beam collimator and/or focussing lens, to ensure that only the radiation transmitted through one rod is detected by a corresponding detector 4a, 4b.

In a tobacco industry product manufacturing machine 10, tobacco rods 2 are manufactured at a typical speed of up to 600 m/min. Preferably, the inspection apparatus 1 is incorporated into the tobacco industry product manufacturing machine 10 and located between a garniture 12, which receives tobacco from a source 13 and wrapping paper from a supply 14, and the cutter 15 for cutting the rod into individual lengths to form smoking articles, as shown in FIG. 4. As the rod 2 passes through the inspection zone 'Z' towards the knife, it will be subjected to continuous radiation through its cross section before it passes through the cutter 15 and onwards to the filter combiner 16 and packer 17.

It has been found that the optimum voltage at which to operate the X-ray generator 3 is between 30 to 80 kV to generate low energy 'soft' X-rays for transmission at a predetermined intensity through the tobacco rod 2. In particular, at a voltage of 60 kV, an aluminium foil of between 6 to 9 microns thick is penetrated more easily, whilst also maintaining a high signal to noise ratio when measuring the density of the tobacco contained within the rod. Accordingly, the accuracy of the density detection is improved.

It has also been found preferable to supply a current of between 0.3-1 mA. Most preferably, a current of 0.6 mA is supplied. A setting of 60 kV and 0.6 mA has been found to be optimum in penetrating the aluminium foil whilst retaining a good signal (signal to noise ratio) when measuring the density of the tobacco contained within the tobacco rod 2.

The detector 4a, any additional detector 4b, and the reference detector 7, may be photodiodes having a 6 to 10 mm diameter. Alternatively a linear array detector may be employed. In particular, the detector 4 may be a silicon photodiode. It may also be modified to include a 1 mm thick CsI(Tl) scintillator bonded to its active surface to increase its x-ray sensitivity. The X-ray generator 3 and the detectors 4 are as close as possible to the tobacco rod 2, but do not touch it.

The detector may comprise a back illuminated photodiode array and a caesium iodide scintillator. Furthermore, the detector may further comprise an optically opaque resin to maximise sensitivity.

As used herein, the term "tobacco industry product" is to be understood as including smoking articles comprising combustible smoking articles such as cigarettes, cigarillos, cigars, tobacco for pipes or for roll-your-own cigarettes, (whether based on tobacco, tobacco derivatives, expanded tobacco, reconstituted tobacco, tobacco substitutes or other smokable material), electronic smoking articles such as e-cigarettes, heating devices that release compounds from substrate materials without burning such as tobacco heating products; and hybrid systems to generate aerosol from a combination of substrate materials, for example hybrid systems containing a liquid or gel or solid substrate.

In one embodiment, the tobacco industry product is a smoking article for combustion selected from the group consisting of a cigarette, a cigarillo and a cigar.

In one embodiment, the tobacco industry product is a non-combustible smoking article.

In one embodiment the tobacco industry product is a heating device which releases compounds by heating, but not burning, a substrate material. The material may be for example tobacco or other non-tobacco products, which may or may not contain nicotine. In one embodiment the heating device is a tobacco heating device.

In another embodiment the tobacco industry product is a hybrid system to generate aerosol by heating, but not burning, a combination of substrate materials. The substrate materials may comprise for example solid, liquid or gel which may or may not contain nicotine. In one embodiment, the hybrid system comprises a liquid or gel substrate and a solid substrate. The solid substrate may be for example tobacco or other non-tobacco products, which may or may not contain nicotine. In one embodiment the hybrid system comprises a liquid or gel substrate and tobacco.

Embodiments of the invention are described with reference to tobacco industry products, for example cigarettes. However, it will be appreciated that the apparatus and methods of the invention may alternatively be used for non-tobacco industry related products.

In order to address various issues and advance the art, the entirety of this disclosure shows by way of illustration various embodiments in which the claimed invention(s) may be practiced and provide a superior method of determining the density of a tobacco rod and an apparatus for simultaneously determining the density of two tobacco rods travelling side-by-side in a longitudinal direction along an inspection path. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. A method of determining the density of an elongate rod of material as it travels in a longitudinal direction through an inspection zone of apparatus for determining the density of an elongate rod of material, wherein the method comprises:
   (a) wrapping the elongate rod in an aluminium foil having a thickness of 6 to 12 microns;
   (b) positioning an X-ray generator of said apparatus to transmit X-rays in a direction across the elongate rod and towards a detector of said apparatus, as the elongate rod travels in a longitudinal direction through said inspection zone of said apparatus;
   (c) supplying a voltage to the X-ray generator of between 20 to 80 kV to transmit the X-rays at a predetermined intensity;
   (d) detecting the intensity of the X-rays transmitted through the elongate rod using the detector, and
   (e) determining a density of the elongate rod based on a comparison of the predetermined and detected intensities.

2. A method according to claim 1, comprising operating the X-ray generator at a voltage of 60 kV.

3. A method according to claim 1, comprising supplying the X-ray generator with a current of between 0.3-1 mA.

4. A method according to claim 3, comprising supplying the X-ray generator with a current of 0.6 mA.

* * * * *